Oct. 6, 1964          A. D. CLAY          3,152,331

HIGH-SPEED INTERMITTENT FEED CAMERA

Filed Oct. 2, 1962          4 Sheets-Sheet 1

INVENTOR.
ARTHUR DAVID CLAY
BY
Barnes, Kisselle, Laisch & Choate
ATTORNEYS

Oct. 6, 1964            A. D. CLAY            3,152,331

HIGH-SPEED INTERMITTENT FEED CAMERA

Filed Oct. 2, 1962            4 Sheets-Sheet 2

INVENTOR.
ARTHUR DAVID CLAY

BY
ATTORNEYS

INVENTOR.
ARTHUR DAVID CLAY
BY
Barnes, Kisselle, Raisch & Choate
ATTORNEYS

Oct. 6, 1964

A. D. CLAY 3,152,331

HIGH-SPEED INTERMITTENT FEED CAMERA

Filed Oct. 2, 1962

INVENTOR.
ARTHUR DAVID CLAY
BY
Barnes, Kisselle, Raisch, & Choate
ATTORNEYS

United States Patent Office 3,152,331
Patented Oct. 6, 1964

3,152,331
HIGH-SPEED INTERMITTENT FEED CAMERA
Arthur David Clay, Waterford, Mich., assignor, by mesne assignments, to McDonnell Aircraft Corporation, St. Louis, Mo., a corporation of Maryland
Filed Oct. 2, 1962, Ser. No. 227,804
14 Claims. (Cl. 352—84)

This invention relates to high-speed intermittent feed cameras and particularly to such cameras utilizing 70 mm. film for taking full frame height pictures.

In analyzing the action of high-speed aircraft and missiles, it is useful to take motion pictures of the action of the aircraft or missiles. In order for these pictures to be of any real value in analyzing the action, they should be taken at frequent intervals at many frames per second. Large 70 mm. pictures are particularly desirable because they can be more easily analyzed.

Conventional types of intermittent feed cameras which utilize hold-down pins, when operated at high speeds on the order of 10 frames per second or more, produce a great deal of vibration necessitating a heavy construction for the cameras and a heavy support or foundation. Obviously, such vibration produces improper images. This problem is especially present in cameras for taking large frame images, on the order of 70 mm. or larger.

It is an object of this invention to provide a high-speed intermittent feed camera which can be operated at high speeds to produce accurate photographs without vibration.

It is a further object of the invention to provide such a camera which will handle large film such as 70 mm. film and produce full frame exposures at high speeds on the order of 60 frames per second or greater.

It is a further object of the invention to provide such a camera which produces an accurate registration of the film at the exposure area at all times.

It is a further object of the invention to provide such a camera wherein there is positive control of the film movement at all times.

Figure 1:
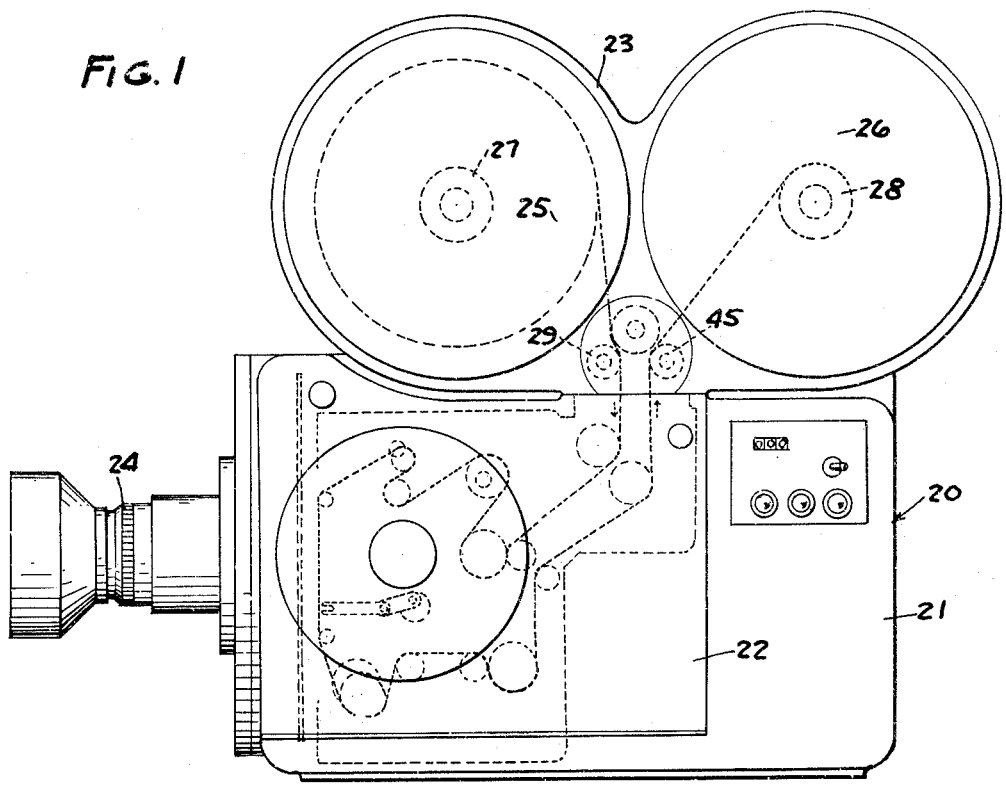
FIG. 1 is a side elevation of a camera embodying the invention, parts being shown in dotted lines.
Figure 2:
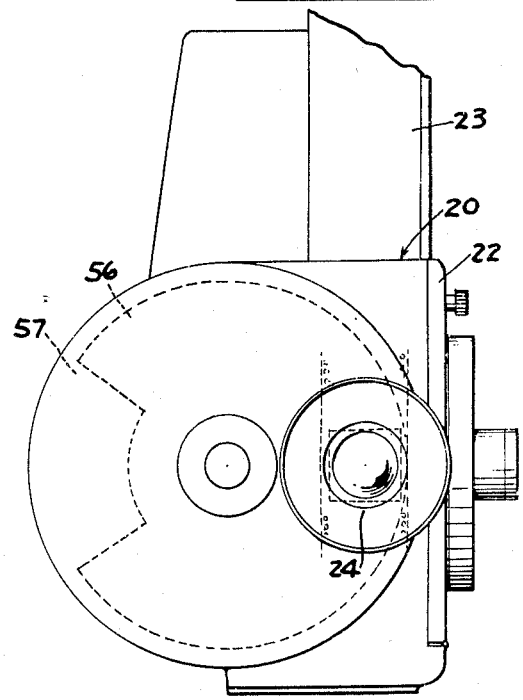
FIG. 2 is a fragmentary front elevation of the camera.

Referring to FIGS. 1 and 2, the camera 20 comprises a housing 21 including a removable side cover 22 and a film magazine 23 mounted on the top of the housing. In addition, a lens 24 is mounted on the front of the housing to direct an image toward the interior of the camera and onto the film as presently described.

The magazine 23 includes removable covers 25, 26 and rotatably supports a film supply spool 27 and a film take-up spool 28. The film passes from the film supply spool 27 past an idler roll 29 in the magazine through an opening in the top wall of the housing 21 and, in turn, past an idler roll 30 (FIG. 3) rotatably mounted on a longitudinally extending wall 31 of the housing 21. The film is, in turn, threaded over a continuously driven feed sprocket 32 and thereafter over a continuously driven tension cam 33 under an idler roll 34 and over a control sprocket 35 which is eccentrically mounted for revolution about an axis lying substantially along its periphery as presently described. The film is then passed across a small idler 36 and over an aperture or exposure area 37 defined by a plate 38, a second small idler 39, under a continuously driven film feed or pull-down cam 40, an idler roll 41 and into engagement with a continuously driven take-up sprocket 42. The film then passes over an idler roll 43 and under an idler roll 44 back through the opening in the top wall of the housing 21 and over an idler roll 45 in the magazine to the take-up spool 28.

In order to maintain the film in contact with the film feed sprocket 32, a guide roller 46 is provided on a bracket 47. The bracket 47 is held in position by a screw 48 threaded into the wall 31. The screw 48 is loosened to permit the bracket 47 to be moved downwardly (FIG. 3) for threading the film under the feed sprocket 32. Similarly, a guide roller 49 is provided in cooperation with the take-up sprocket 42 on a bracket 50 held in position by a screw 51. When the screw 51 is loosened, the bracket 50 may be moved to the left (FIG. 3) in order to permit threading of the film between the guide roller 49 and the take-up sprocket 42.

Figure 9:
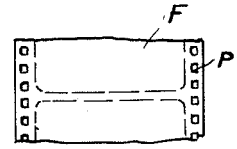
FIG. 9 is a fragmentary plan of a portion of the film used in the camera.

In order to hold the film in accurate registration at the exposure area 37 when the movement of film is interrupted, registration pins 52 are provided on reciprocating members 53 that are connected by a crank arm 54 eccentrically to rotatable members 55 fixed on a shaft 55a journalled in wall 31 (FIG. 7) so that the pins are moved intermittently or periodically horizontally into and out of engagement with the perforations P on the film F (FIG. 9).

Exposure area 37 which is defined by plate 38 includes a rectangular grooved channel 38a to which vacuum is continuously supplied by a vacuum pump P to assist in maintaining the film flat against the plate 38.

A shutter 56 in the form of a disc is rotatably mounted in the camera and moves across the exposure area 37 between the lens 24 and the exposure area 37. The shutter disc 56 is provided with a radial aperture 57.

The feed sprocket 32 and take-up sprocket 42 are driven continuously to feed the film and remove the film from the exposure area. The control sprocket 35 and pull-down cam 40 are also driven continuously in synchronism to periodically move a length of film to the exposure area and interrupt the movement for exposure. Tension cam 33 is moved continuously to maintain the film in engagement with the control sprocket 35. The member 55 is rotated continuously to move the registration pins 53 periodically into engagement with the film.

Figure 3:
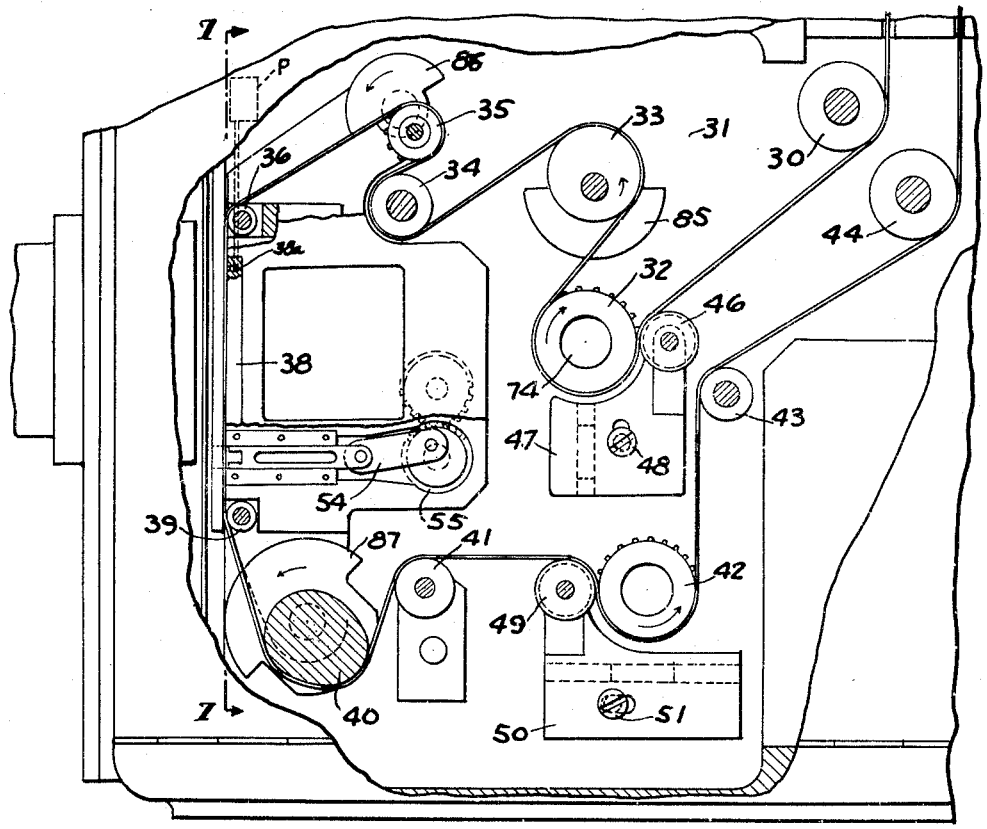
FIG. 3 is a part sectional side elevation of the camera, parts being broken away.
Figure 6:
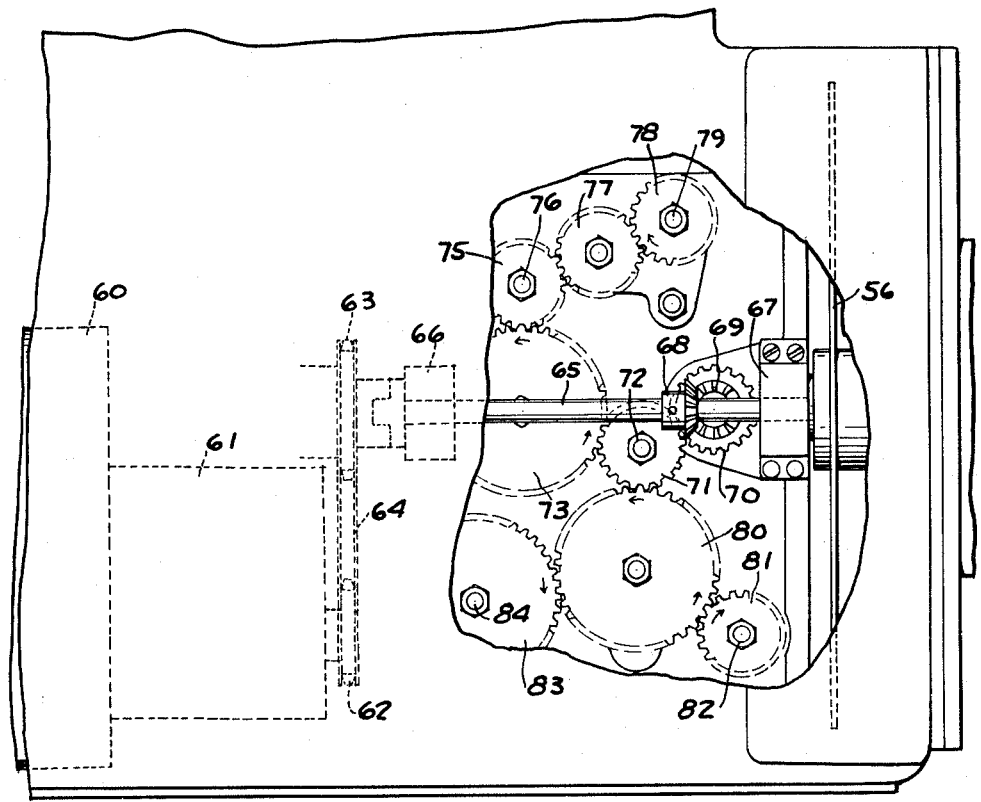
FIG. 6 is a fragmentary part sectional side elevation, parts being broken away of the other side of the camera.
Figure 7:
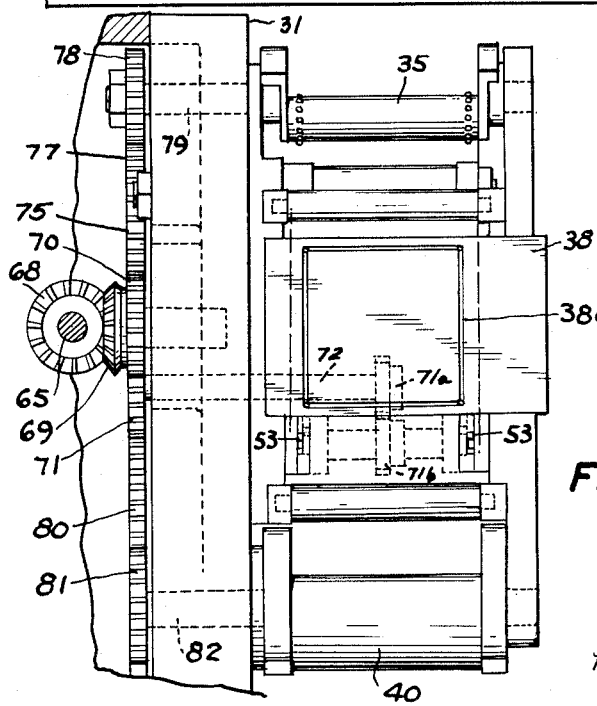
FIG. 7 is a fragmentary sectional view taken along the line 7—7 in FIG. 3.
Figure 8:
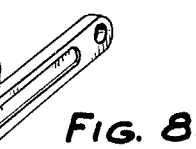
FIG. 8 is a perspective view of a registration member used in the camera.

These various synchronized movements are achieved by a construction such as shown in FIGS. 6 and 7, namely, from a motor 60 which drives reduction gearing 61 and a sprocket 62. The sprocket 62, in turn, drives a sprocket 63 by an endless chain 64. The sprocket 63 is fixed to one end of a shaft 65 journalled on the opposite side of wall 31 by bearings 66, 67. Shutter 56 is fixed on the other end of the shaft 65 so that it is continuously driven when the motor 60 is operated. A bevel gear 68 is pinned to the shaft 65 and drives a second bevel gear 69 journalled in the wall 31. Bevel gear 69 is fixed to a pinion 70 that drives a gear 71. Gear 71 is fixed on one end of a shaft 72 journalled in wall 31. A gear 71a fixed on the other end of shaft 72 meshes with a gear 71b fixed on a shaft 55a to rotate rotatable members 55 and drive the pin registration members 53 (FIGS. 3, 7).

Gear 71, in turn, meshes with a drive gear 73 that is fixed on the shaft 74 journalled in the wall 31. The feed sprocket 32 is fixed to the shaft 74 on the opposite side of the wall 31. A gear 75 is meshed with the gear 73 and is fixed to a shaft 76 journalled on wall 31 on which the control cam 33 is mounted. In turn, an idler gear 77 meshes with a gear 75 and a gear 78 on the shaft 79 on which the control sprocket 35 is mounted. An idler gear 80 also journalled on wall 31 meshes with the gear 71 and drives the gear 81 fixed to the shaft 82 journalled on wall 31 and on which the pull-down cam 40 is mounted. The idler gear 80 also drives a gear 83 on a shaft 84 journalled on wall 31 and on which the film take-up sprocket 42 is mounted. For counterbalance purposes, counterweights 85, 86 and 87 are provided on the tension cam 33, control sprocket 35 and pull-down cam 87, respectively (FIG. 3). The film take-up spool is driven from motor 60 through a linkage (not shown).

Figures 4, 5:
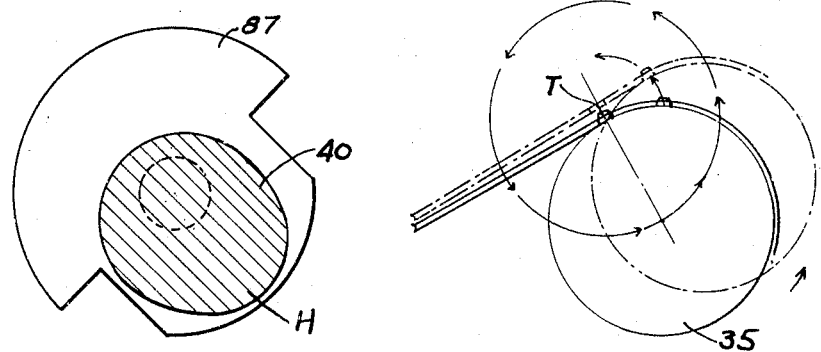
FIG. 4 is a diagram showing the action of a control sprocket utilized in the camera.
FIG. 5 is a part sectional elevation of a feed cam used in the camera.

As shown in FIG. 4, the control sprocket 35 is mounted in such a manner that it revolves substantially about one tooth T. More specifically, the control sprocket 35 revolves about an axis lying parallel to the pitch line of the film which engages the tooth T and counterclockwise as shown in FIG. 4. In this fashion, the sprocket moves counterclockwise toward and away from the exposure area 37.

The pull-down cam 40, as shown in FIG. 5, comprises a high portion H and is so dimensioned that as the high portion H moves away from the exposure area 37, film is rapidly moved downwardly at a controlled rate away from the exposure area and as the high portion H moves upwardly and counterclockwise toward the exposure area it is moved rapidly away from the film permitting the film to be pulled by the take-up sprocket 42, as presently described.

Figure 10:
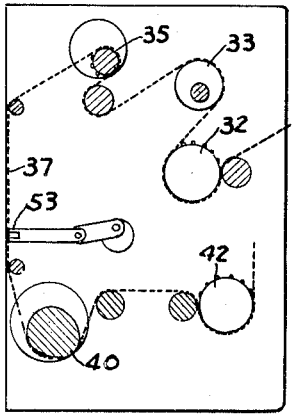
FIGS. 10-17 are diagrammatic views showing the relative positions of the parts of the film feed and control mechanism of the camera.
Figure 11:
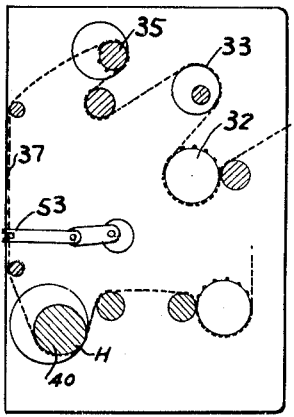
Figure 12:
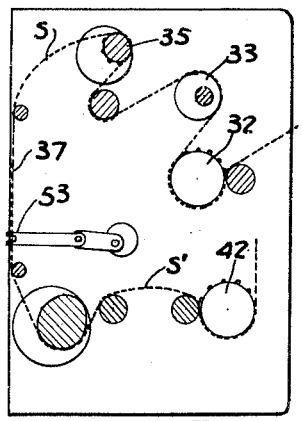
Figure 13:
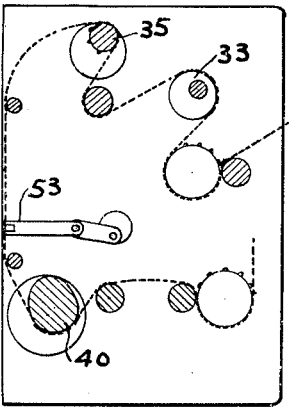
Figure 14:
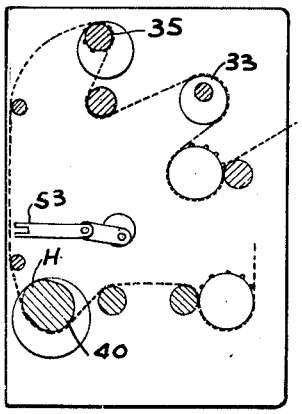
Figure 15:
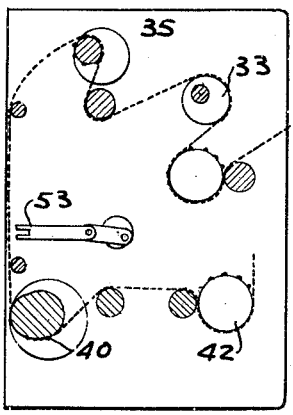
Figure 16:
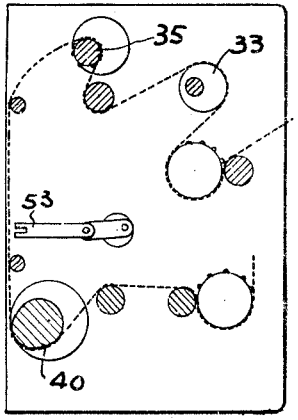
Figure 17:
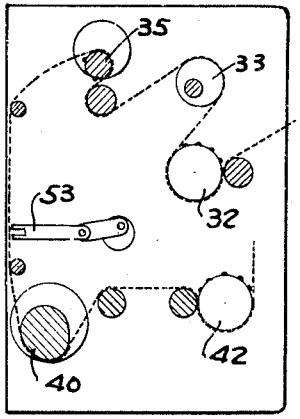

The operation of the camera during various portions of the film feed can be more readily understood by referring to FIGS. 10–17 which are diagrammatic showings of the relative positions of the various parts. Throughout the operation, the feed and take-up sprockets 32, 42, the control sprocket 35, the tension cam 33, the pull-down cam 40 and shutter 56 are continuously rotating. As shown in FIG. 10, the feeding of the length of film to the exposure area 37 has been completed and the registration pins 53 are about to enter the perforations to hold the film in position for exposure. As the registration pins 53 enter the film (FIG. 11), the film is taut and stationary, the control sprocket 35 being in substantially the position shown in FIG. 4. The control sprocket 35 then begins its movement toward the exposure area, revolving counterclockwise about a line substantially in the periphery of the sprocket producing a slack length S in the film between the exposure area and the sprocket (FIG. 12). At the same time, the tension cam 33 is rotating counterclockwise with the high portion thereof interrelated in such a manner as to maintain the film taut and in contact with the control sprocket 35. In order to compensate for the continuous take up of film by the take-up sprocket 42, the pull-down cam 40, which is at this time in a position where the high portion H thereof is furthest from the exposure area, is, in the meantime, rotating counterclockwise moving the high portion H toward the exposure area and away from the film in contact therewith so that the film is permitted to pass to the film take-up sprocket 42. The rate at which the pull-down cam 40 tends to move away from the film because of its shape is such that the film tends to slacken as at S' (FIG. 12). During this time, the shutter has moved across the exposure area to expose the film.

As the registration pins 53 move out of registration with the film (FIG. 14), the high portion H of the pull-down cam 40 is adjacent the exposure area and begins to move rapidly downwardly and away from the exposure area (FIG. 15) taking up the slack S that has been formed (FIGS. 16 and 17) so that the high portion H of the pull-down cam 40 moves to its lowest position having pulled a new length of film across the aperture 37 at a controlled rate. During this time, the control sprocket 35 revolves and maintains the film taut between the sprocket 35 and pull-down cam 40 to control the movement of the film within precise limits. Finally, the control sprocket 35 and pull-down cam 40 achieve the positions shown in FIG. 10 where the film is stationary and taut across the exposure area 37 in position for re-entry of registration pins 53.

It can thus be seen that there has been provided a positive control of the movement of the film intermittently without the use of intermittent pull-down pins. Since all of the parts are continuously moving, a minimum vibration is achieved. Accurate feeding of the film is achieved without slippage or waste because of the interrelationship between the positive engagement of the film at all times by the control sprocket 35 and the controlled movement of the film by the pull-down cam 40.

I claim:
1. In a camera, the combination comprising
means defining an exposure area across which film is moved for successive exposure,
means for projecting an image onto said exposure area,
a shutter mounted to expose successive portions of said film,
means for positively engaging a strip of film at longitudinally spaced points and continuously moving said film to define a loop between said points extending across said exposure area,
a sprocket driven continuously in synchronism with said last-mentioned means rotatably mounted eccentrically in advance of said exposure area and having teeth thereon engaging the perforations in said strip of film,
means positioned between said sprocket and said engaging means for maintaining the film taut therebetween,
a non-circular film feed cam rotatably mounted beyond said exposure area driven continuously in synchronism with said sprocket and having a high portion which moves toward and away from the exposure area,
said sprocket and feed cam being driven in synchronism such that during exposure of the film at the exposure area the sprocket revolves away from the aperture about its center such that the film remains stationary at the exposure area and a slack length is defined between the exposure area and the sprocket and during movement of the film across the exposure area the sprocket revolves toward the exposure area,
while during exposure the high portion of said feed cam rotates toward the exposure area permitting take up of the film by the film moving means and thereafter the high portion of the feed cam moves away from the exposure area to pull the film across the exposure area at a controlled rate and take up the slack length created by movement of the sprocket away from the exposure area during said exposure.
2. In a camera, the combination comprising
means defining an exposure area across which film is moved for successive exposure,
means for projecting an image onto said exposure area,
a shutter mounted to expose successive portions of said film,
means for positively engaging a strip of film at longitudinally spaced points and continuously moving said film to define a loop between said points extending across sad exposure area,
a cylindrical sprocket driven continuously in synchronism with said last-mentioned means rotatably mounted eccentrically for revolution about an axis substantially tangent to said sprocket in advance of said exposure area and having teeth thereon engaging the perforations in said strip of film, means positioned between said sprocket and said engaging means for maintaining the film taut therebetween, a non-circular film feed cam rotatably mounted beyond said exposure area driven continuously in synchronism with said sprocket and having a high portion which moves toward and away from the exposure area, means for periodically engaging the film at the exposure area for registering the film for exposure, said sprocket and feed cam being driven in synchronism such that during exposure of the film at the exposure area the sprocket revolves away from the exposure area about its center such that the film remains stationary at the exposure area and a slack length is defined between the exposure area and the sprocket and during movement of the film across the exposure area the sprocket revolves toward the exposure area, while during exposure the high portion of said feed cam rotates toward the exposure area permitting take up of the film by the film moving means and thereafter the high portion of the feed cam moves away from the exposure area to pull the film across the exposure area at a controlled rate and take up the slack length created by movement of the sprocket away from the exposure area during said exposure.

3. The combination set forth in claim 2 wherein said means for periodically engaging the film at the exposure area comprises registration pins engaging the perforations of the film and driven in synchronism with said sprocket, cam and shutter.

4. The combination set forth in claim 2 wherein said means for maintaining said film taut between said sprocket and said feed means comprises a cam driven in synchronism with said feed means and said sprocket.

5. The combination set forth in claim 2 including vacuum means at said exposure area maintaining said film in engagement with said exposure defining means.

6. In a camera, the combination comprising means defining an exposure area across which a strip of film is periodically and successively fed, means for projecting an image on said exposure area, a continuously driven shutter mounted to expose periodically said film at said exposure area, continuously driven sprocket means for engaging said film on opposite sides of said exposure area, a control sprocket rotatably mounted eccentrically for revolution in advance of the exposure area, a tension cam positioned between the control sprocket and said continuously driven sprocket means for maintaining said film in engagement with said control sprocket, a film feed cam rotatably mounted beyond said exposure area and having a high portion which moves toward and away from the exposure area, registration pins movable periodically into engagement with the film adjacent the exposure area for holding said film in registry for exposure, and means for driving said feed means, shutter, control sprocket, tension cam, feed cam and registration pins in synchronism such that when said registration pins are in engagement with said film at said exposure area, said control sprocket revolves away from the exposure area about its axis of revolution such that the film remains stationary at the exposure area and so that the sprocket means feeds film to define a slack length between the exposure area and the control sprocket and the high portion of said feed cam moves away from the film and toward the exposure area permitting the film between the exposure area and the film feed cam to be continuously taken up by said sprocket means, and when said registration pins move out of engagement with said film at said exposure area, said control sprocket revolves toward said exposure area and the high portion of said feed cam moves away from said exposure area moving the slack length of film across the exposure area at a controlled rate.

7. The combination set forth in claim 6 wherein said control sprocket is mounted for revolution substantially about an axis lying in the periphery thereof.

8. The combination set forth in claim 6 including an idler positioned between said tension cam and said control sprocket.

9. The combination set forth in claim 6 including an idler positioned between said feed cam and said continuously driven sprocket means.

10. The combination set forth in claim 6 wherein said continuously driven sprocket means comprises a pair of sprockets, one of which is in engagement with the film in advance of the exposure area and the other of which is in engagement with the film beyond the exposure area.

11. The combination set forth in claim 6 wherein said registration pins comprise a member mounted for axial movement toward and away from registration with the apertures of the film, and eccentric means driven in synchronism with said film feed means for reciprocating said member.

12. In a camera, the combination comprising means defining an exposure area across which film is moved for successive exposure, a film supply spool, a film take-up spool, means for projecting an image onto said exposure area, a shutter mounted to expose successive portions of said film, means for positively engaging a strip of film at longitudinally spaced points and continuously moving said film from said supply spool to said take-up spool to define a loop between said points extending across said exposure area, a control sprocket driven continuously in synchronism with said last-mentioned means mounted eccentrically in advance of said exposure area and having teeth thereon engaging the perforations in said strip of film, means positioned between said sprocket and said engaging means for maintaining the film taut therebetween, a non-circular feed cam rotatably mounted beyond said exposure area driven continuously in synchronism with said sprocket and having a high portion which moves toward and away from the exposure area, registration pins movable periodically into engagement with the film adjacent the exposure area for holding said film in registry for exposure, and means for driving said engaging means, shutter, control sprocket, means for maintaining the film taut, feed cam and registration pins in synchronism such that when said registration pins are in engagement with said film at said exposure area said control sprocket revolves away from the exposure area about its axis of revolution such that the film remains stationary at the exposure area and a slack length is defined between the exposure area and the control sprocket and the high portion of said feed cam moves away from the film and toward the exposure area permitting the film between the exposure area and the feed cam to be continuously taken up by said film moving means and supplied to said take-up spool, and when said registration pins move out of engagement with said film at said exposure area, said control sprocket revolves toward said exposure area and the high portion of said feed cam moves away from said exposure area moving the slack length of film across the exposure area at a controlled rate.

13. In a camera, the combination comprising
means defining an exposure area across which film is moved for successive exposure,
a film supply spool,
a film take-up spool,
means for projecting an image onto said exposure area,
a shutter mounted for periodic actuation to expose successive portions of said film,
means for positively engaging a strip of film at longitudinally spaced points and continuously moving said film to define a loop between said points extending across said exposure area,
a cylindrical control sprocket driven continuously in synchronism with said last-mentioned means rotatably mounted eccentrically for revolution about an axis substantially parallel to a tangent to said sprocket in advance of said exposure area and having teeth thereon engaging the performations in said strip of film,
means positioned between said sprocket and said film moving means for maintaining the film taut therebetween,
a non-circular film feed cam driven continuously in synchronism with said sprocket beyond said exposure area having a high portion which moves toward and away from the exposure area,
means for periodically engaging the film at the exposure area for registering the film for exposure,
and means for driving said, film moving means, shutter, control sprocket, means for maintaining the film taut, feed cam and registering means in synchronism such that when said registering means are in engagement with said film at said exposure area said control sprocket revolves away from the exposure area about its axis of revolution such that the film remains stationary at the exposure area and a slack length is defined between the exposure area and the control sprocket and the high portion of said feed cam moves away from the film and toward the exposure area permitting the film between the exposure area and the feed cam to be continuously taken up by said film moving means and supplied to said take-up spool,
and when said registering means moves out of engagement with said film at said exposure area, said control sprocket revolves toward said exposure area and the high portion of said feed cam moves away from said exposure area moving the slack length of film across the exposure area at a controlled rate.

14. In a camera, the combination comprising
means defining an exposure area across which a strip of film is periodically and successively fed,
a film supply spool,
a film take-up spool,
means for projecting an image on said exposure area,
a disc shutter mounted to expose said film at said exposure area,
continuously driven sprocket means for engaging said film on opposite sides of said exposure area,
a cylindrical control sprocket mounted for revolution in advance of the exposure area,
said control sprocket being mounted for revolution about an axis of a tooth thereof and at the pitch line of the film on said sprocket,
a tension cam positioned between the control sprocket and said continuously driven sprocket means for maintaining said film in engagement with said control sprocket,
a film feed cam rotatably mounted beyond said exposure area,
registration pins movable periodically into engagement with the film adjacent the exposure area for holding said film in registry for exposure,
and means for driving said continuously driven sprocket means, shutter, control sprocket, tension cam, feed cam and registration pins in synchronism such that when said registration pins are in engagement with said film at said exposure area, said control sprocket revolves away from the exposure area about its axis of revolution such that the film remains stationary at the exposure area and a slack length is defined between the exposure area and the control sprocket and a high portion of said feed cam moves away from the film and toward the exposure area permitting the film between the exposure area and the feed cam to be continuously taken up by said continuously driven sprocket means and supplied to said take-up spool,
and when said registration pins move out of engagement with said film at said exposure area, said control sprocket revolves toward said exposure area and the high portion of said feed cam moves away from said exposure area moving the slack length of film across the exposure area at a controlled rate.

References Cited in the file of this patent

UNITED STATES PATENTS

| | | |
|---|---|---|
| 1,039,501 | Dunhem | Sept. 24, 1912 |
| 1,954,885 | Mitchell et al. | Apr. 17, 1934 |
| 2,225,832 | Holbrook | Dec. 24, 1940 |
| 2,407,795 | Nelson | Sept. 17, 1946 |

FOREIGN PATENTS

| | | |
|---|---|---|
| 375,625 | Great Britain | June 30, 1962 |
| 693,581 | France | Sept. 1, 1930 |